United States Patent [19]

Cur et al.

[11] Patent Number: 5,364,577

[45] Date of Patent: Nov. 15, 1994

[54] VACUUM PANEL MANUFACTURING PROCESS

[75] Inventors: Nihat O. Cur, Royalton Township, Berrien County; Richard W. Kruck, Sodus Township, Berrian County, both of Mich.

[73] Assignee: Whirlpool Corporation, Benton Harbor, Mich.

[21] Appl. No.: 35,824

[22] Filed: Mar. 23, 1993

[51] Int. Cl.$^5$ ............... B29C 43/22; B65B 1/22; B65B 31/00
[52] U.S. Cl. .................................. 264/69; 53/434; 53/437; 53/472; 264/102; 264/112; 264/297.8
[58] Field of Search ............... 264/69, 101, 102, 112, 264/71, 297.8; 53/432, 434, 436, 437, 440, 472

[56] References Cited

U.S. PATENT DOCUMENTS

| | | | |
|---|---|---|---|
| 3,156,975 | 11/1964 | Shaw | 53/440 |
| 3,469,364 | 9/1969 | Bischoff | 53/434 X |
| 3,962,014 | 6/1976 | Hughes et al. | 264/112 |
| 4,554,041 | 11/1985 | Schreier et al. | 156/276 |
| 4,636,415 | 1/1987 | Barito et al. | 428/68 |
| 4,668,551 | 5/1987 | Kawasaki et al. | 428/69 |
| 4,681,788 | 7/1987 | Barito et al. | 53/434 X |
| 4,798,753 | 1/1989 | Abuaf et al. | 428/69 |
| 5,009,308 | 4/1991 | Cullen et al. | 53/440 X |
| 5,018,328 | 5/1991 | Cur et al. | |
| 5,066,437 | 11/1991 | Barito et al. | 264/102 X |
| 5,076,984 | 12/1991 | Bisplinghoff et al. | 264/102 |
| 5,090,981 | 2/1992 | Rusek, Jr. | 264/102 X |
| 5,220,768 | 6/1993 | Arts | 53/436 X |
| 5,228,270 | 7/1993 | Aarts | 53/436 X |

FOREIGN PATENT DOCUMENTS 2444996  4/1976  Germany ................ 53/437

*Primary Examiner*—Karen Aftergut
*Attorney, Agent, or Firm*—Stephen D. Krefman; Thomas J. Roth; Robert O. Rice

[57] ABSTRACT

A method for manufacturing a vacuum insulation panel is provided which includes the steps of: drying a quantity of microporous powder; evacuating the powder of gases; evacuating a gas impermeable bag of gases; loading the powder into the gas impermeable bag while the bag and powder remain in an evacuated condition; and sealing the gas evacuated bag with the gas evacuated powder therein to form a vacuum insulation panel. The powder in the bag should be compacted before the bag is sealed and also a trace amount of helium may be injected into the bag prior to sealing to assist in leak detection of the sealed panel. The panel with injected helium has an internal pressure not exceeding 1 mm Hg.

20 Claims, 5 Drawing Sheets

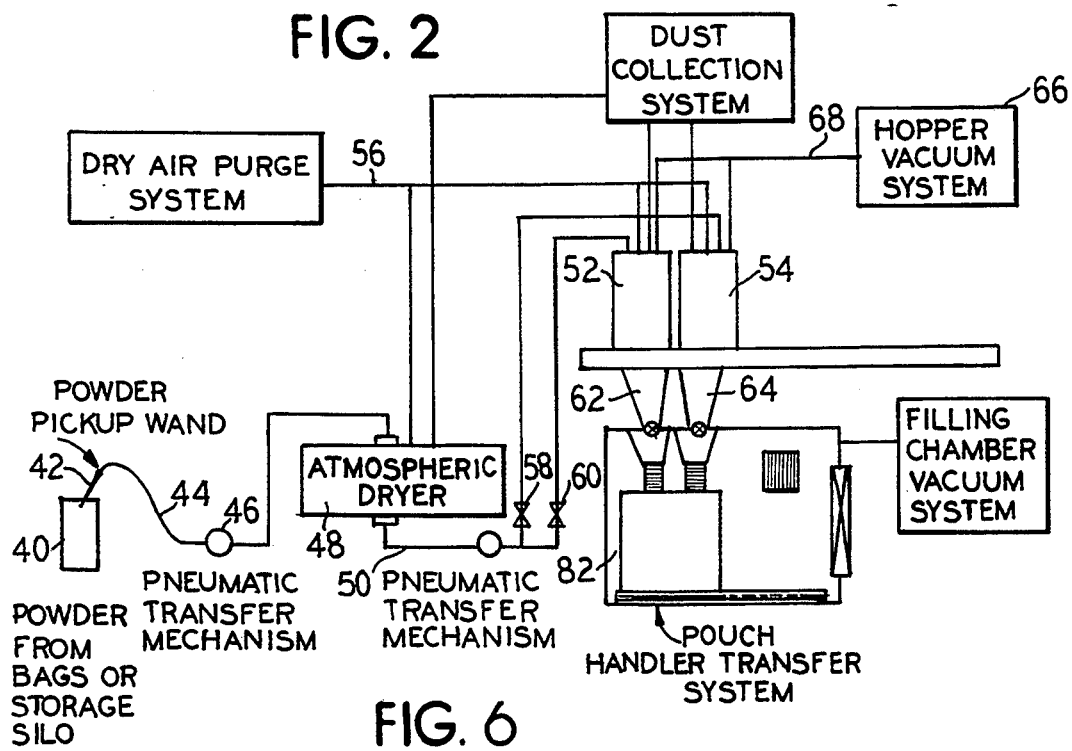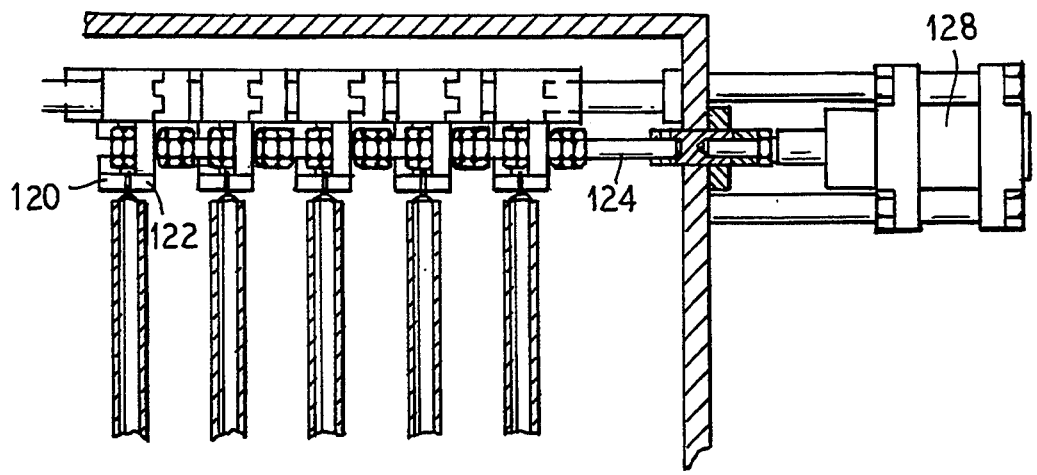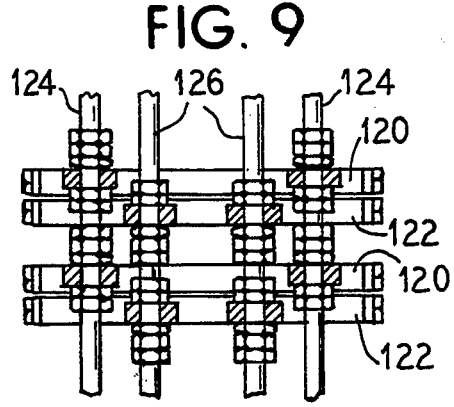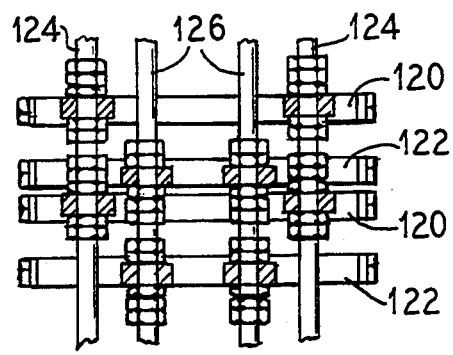

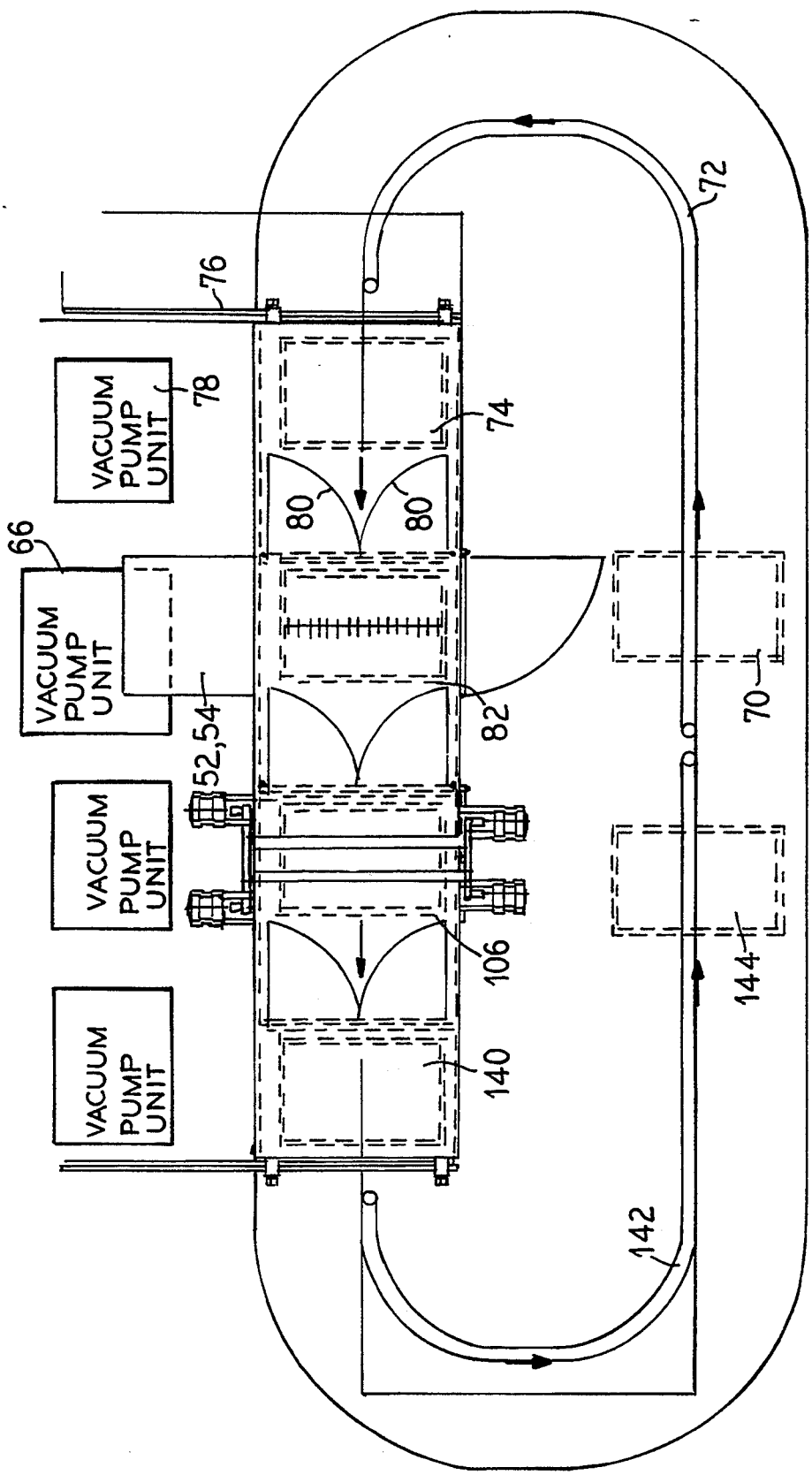

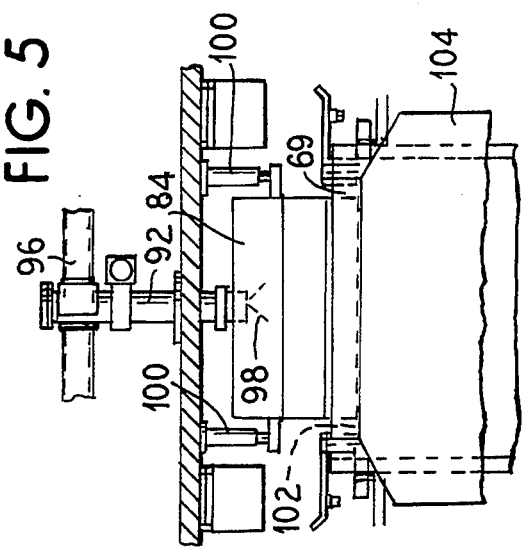
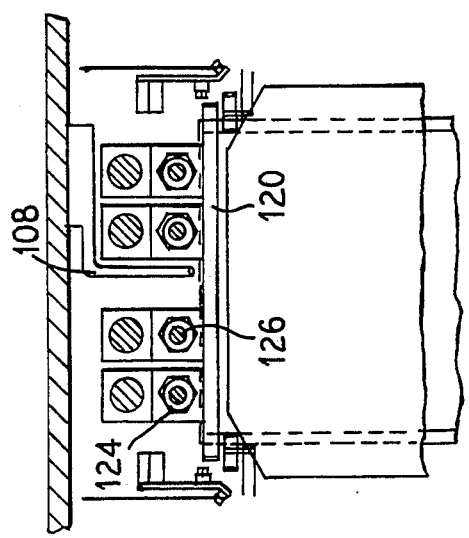
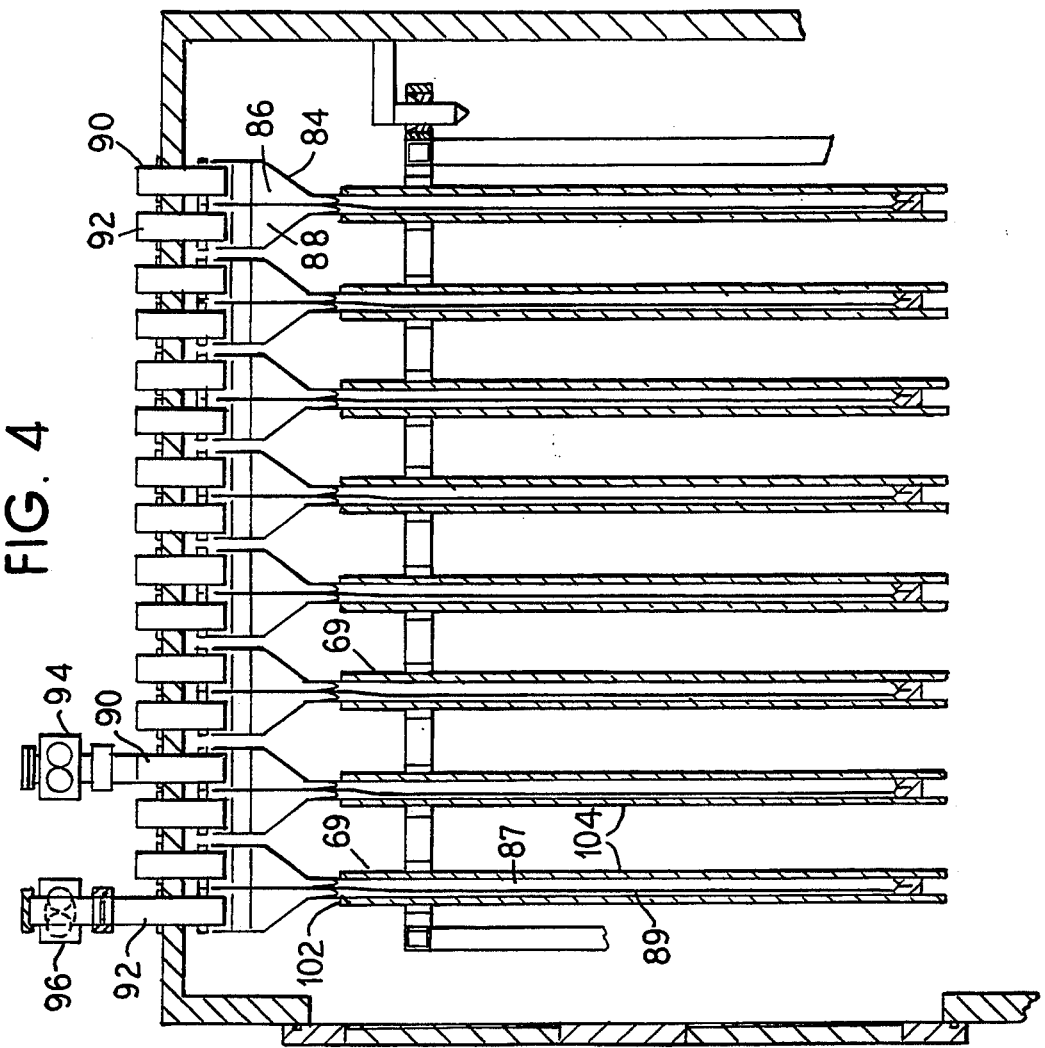

VACUUM PANEL MANUFACTURING PROCESS

BACKGROUND OF THE INVENTION

The present invention relates to a vacuum panel manufacturing process, and in particular a process utilizing a powdered insulation material which is first evacuated of gases and subsequentially loaded and hermetically sealed into an impermeable barrier bag.

Vacuum insulation panels are useful in a variety of environments, and in particular in conjunction with refrigeration apparatus in which they are utilized as insulating panels in the walls of refrigerators and freezers.

Typically a vacuum insulation panel has some type of insulating material, generally microporous powders or microporous sheets of insulating material which are placed into a non-porous bag comprising flexible gas impermeable walls and, after evacuation of all gases, the bag is sealed. Such panels and a method for fabricating them are disclosed in U.S. Pat. No. 5,018,328, assigned to Whirlpool Corporation, the assignee of the present application, the disclosure of said patent being incorporated herein by reference, as well as in U.S. Pat. Nos. 5,076,984 and 4,683,702.

U.S. Pat. No. 4,554,041 discloses a vacuum insulated pipe in which the evacuated insulating space is filled with powder from an evacuated hopper. German Patent 40 40 144 discloses a method for filling a bag with dust-like material wherein the bag and the dust-like material are vacuum evacuated prior to and during filling of the bag.

SUMMARY OF THE INVENTION

The present invention provides a method for manufacturing vacuum panels in a significantly improved process over other presently known processes.

In an embodiment of the invention, the microporous powder is initially heated and dried and transferred, under a dry nitrogen or dry air blanket, to a hopper. In the hopper, the powder is evacuated of gases (preferably while the powder is hot) and then transferred to a metering hopper.

Separately, the barrier bags are moved into an air lock chamber where gases are evacuated and, subsequent to the evacuation, the bags are moved into a filling chamber. In the filling chamber the metering hoppers are actuated to cause the evacuated powder to be dispensed into the bags to fill the bags. Once the bags have been filled they are heat sealed closed. As an option, after the bags have been filled with the evacuated powder, and just prior to sealing of the bags, a small and specific amount of helium (preferably at a pressure of less than 1 mm Hg) can be injected into the bag which is then immediately sealed in order to allow for helium leak testing of the panel as disclosed in copending application Ser. No. 635,489, filed Dec. 28, 1990, the disclosure of which is incorporated herein by reference.

The panels are then formed into a final shape, after having been sealed, and then the panels are moved into an outfeed air lock chamber where the bags are reintroduced to atmospheric air pressure. The bags are then moved to a deposit area as completed panels.

Preferably a plurality of bags are formed into panels at the same time in the filling chamber in order to reduce the average cycle time per panel.

BRIEF DESCRIPTION OF THE DRAWINGS

FIG. 2 is a schematic illustration of the equipment layout for the implementing.

FIG. 3 is a schematic plan view illustration of the equipment layout for implementing the present invention.

FIG. 4 is a side sectional view illustrating the bag filling apparatus utilized in the method of the present invention.

FIG. 5 is a side sectional view of the bag filling apparatus taken at 90° to that illustrated in FIG. 4.

FIG. 6 is a side sectional view of a heat sealing apparatus used to seal the vacuum panel.

FIG. 7 is a side sectional view of the heat sealing apparatus taken 90° to that illustrated in FIG. 6.

FIG. 8 is a plan view of the heat sealing apparatus in the operation.

FIG. 9 is a plan view of the heat sealing apparatus in the closed position.

DETAILED DESCRIPTION OF THE PREFERRED EMBODIMENTS

Figure 1:
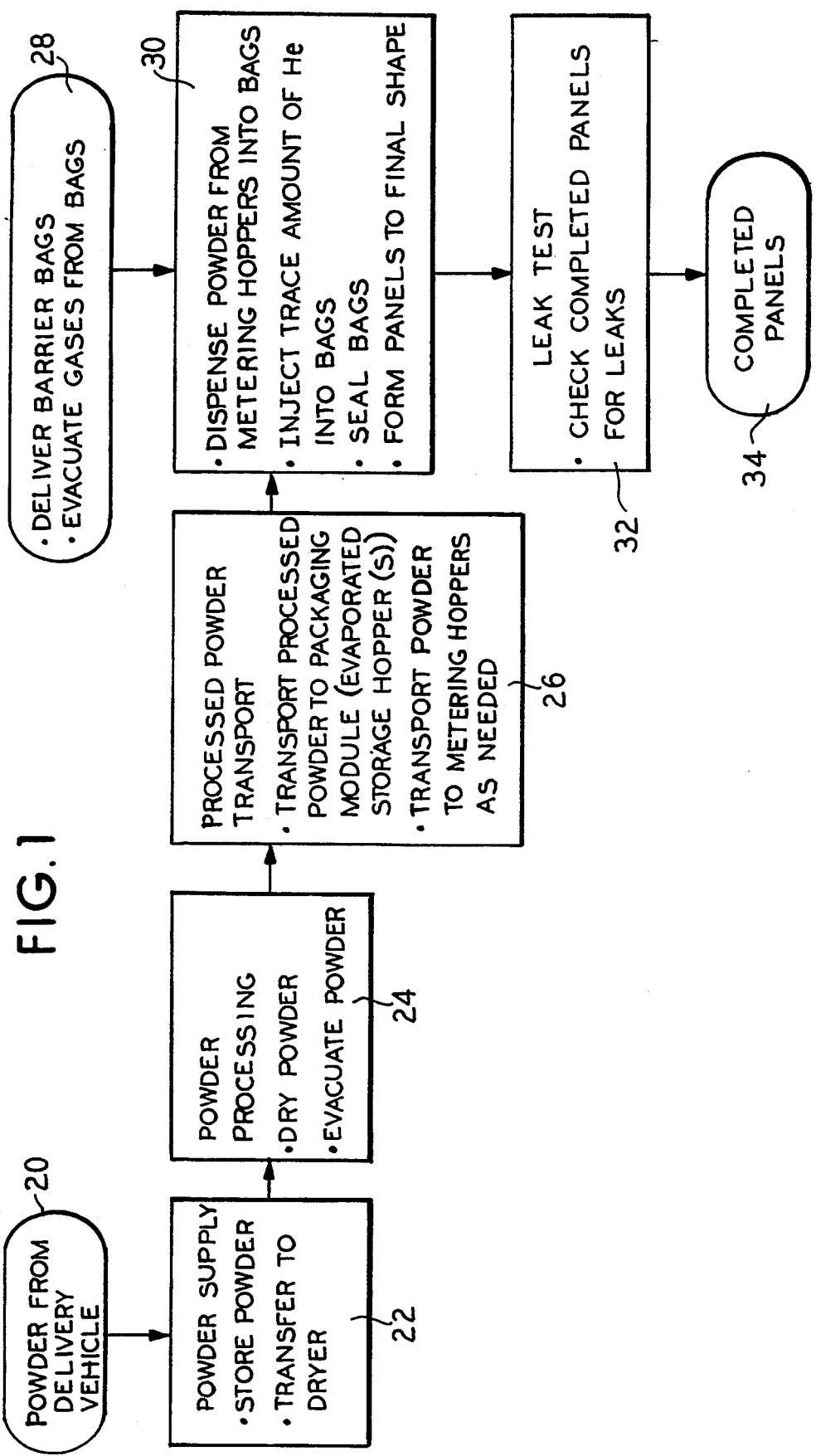
FIG. 1 is a flow chart schematically illustrating an embodiment of the method of the present invention.

In FIG. 1 there is illustrated an embodiment of a method for manufacturing a vacuum insulation panel. In this panel, a microporous powder is used as the insulating material. Step 20 shows a step of delivery of the powder from a delivery vehicle. The powder is delivered to a powder supply device, such as a storage hopper in step 22. The powder is then processed in step 24 such as by heating, drying and optionally subjecting it to a vacuum in order to remove moisture from the powder. The heating of the powder at this stage, to remove moisture, can occur at temperatures up to 400° F. (205° C.) or higher if desired. The dry powder is then transferred in step 26 to a storage hopper where it will be evacuated of gases (preferably while the powder is still hot) if that has not already been accomplished. From the storage hopper, the powder is transferred to a metering hopper as indicated in step 26.

The vacuum insulation panel is made with gas impervious barrier bags, preferably having multiple compartments within each bag. In a preferred embodiment, the bag consists of two compartments which are fabricated simultaneously by heat sealing three layers of plastic flexible barrier films (two vacuum metalized plastic films and one aluminum foil plastic laminate film) at one time. Three of the sides are sealed closed and the fourth side of the bag is left open in order to receive the powder. As indicated in step 28, the barrier bags are delivered and evacuated of gases.

Next, in step 30, the bags are moved into a filling chamber in which the powder from the metering hoppers is dispensed into the bags. This filling chamber is maintained under a vacuum so that the transfer of the powder into the bag occurs under vacuum as well.

After the bag compartments have been filled with powder, in a preferred embodiment, a small trace amount of helium (preferably below 1 mm Hg pressure) is injected into each of the compartments and then the bag is immediately sealed. Once the bags are sealed into panels, the panels are preferably pressed into a final shape in the form of a flat board-like panel and then the panels are reintroduced to atmospheric pressure.

If the panels have been injected with helium, a leak test as indicated in step 32 can be conducted on the panels to insure the vacuum integrity of the panels. The testing can be done in accordance with the teachings of copending application Ser. No. 635,489, filed Dec. 28, 1990, now abandoned, the disclosure of which is incorporated herein by reference. Upon completion of the leak test, the panels are completed as indicated in step 34 and are moved to a storage area.

FIGS. 2 and 3 illustrate a schematic equipment layout for an automated version of the process described in FIG. 1. The powder is transferred from bags 40 by means of a powder pickup wand 42 through a conduit 44 and a pneumatic transfer mechanism 46 to a dryer 48 (which may be an atmospheric dryer or a vacuum oven) to dry the powder. The dried powder is then transferred through a conduit 50 to one of two storage hoppers 52, 54, which can be supplied with a dry nitrogen or dry air internal atmosphere through conduit 56. Valves 58, 60 are used to selectively direct the powder to one of the two hoppers 52, 54. The powder supplied to each of the two hoppers 52, 54 may vary somewhat in that two compartments are provided in the vacuum insulation panels in the preferred embodiment. For example, different types of gettering material may be used in each of the two compartments as disclosed in U.S. Pat. No. 5,091,233, the disclosure of which is incorporated herein by reference. The hoppers 52 and 54 feed into metering hoppers 62, 64, all of which are maintained under vacuum by means of a hopper vacuum system 66 connected to the hoppers by a conduit 68. In a preferred embodiment, the evacuated pressure in the hopper is less than 2 mbars, preferably around 0.5 mbars.

Barrier bags 69 (FIG. 4) are stored in an area 70 (FIG. 3) and a selected number of bags are transported by an automatic conveyor 72 into an infeed air lock chamber 74.

The bags 69 are attached to a clamping device which includes a spread finger to hold a top end of the bag open. A spreading of each compartment to around 15 mm has been determined to be sufficient to fill the bag successfully (this might vary depending on the final thickness of the panel). Preferably two fixed fingers are used on one side and two separately attached spring loaded fingers are used on the other side. The spreading device is mounted on a carriage which preferably is designed to carry multiple bags 69 for the simultaneous production of multiple panels. The entire carriage is then moved into the chamber 74. Once a door 76 of the chamber 74 has been closed and the chamber has been evacuated by means of a vacuum pump 78, preferably to a pressure of approximately 0.5 mbar, a set of doors 80 are opened permitting the selected and now evacuated bags 69 to be moved into an evacuated filling chamber 82. The filling chamber 82 preferably is positioned directly below the powder storage hoppers 52, 54. Within the filling chamber 82 are a plurality of filling nozzles 84 (FIGS. 4 and 5) which can be inserted into the bags 69 for filling the bags. The nozzles 84 are preferably in the shape of funnels with a width at least 80% of the width of the bags 69. Each nozzle 84 has two internal passages 86, 88, one for feeding each of the two compartments 87, 89 of the bag. Each passage 86, 88 is supplied by a short transfer tube 90, 92 which in turn connects with an auger conveyor 94, 96 which communicates with the metering hoppers 64, 62. A lower end of each tube is positioned above a roof type flow deflector 98 to spread the flow of powder. The funnel nozzles 84 may be vibrated, for example at 100 Hz, to achieve even flow and reduce adhesion of powder on the nozzle wall.

The nozzles 84 are carried on extendable arms 100 (FIG. 5) which permit the nozzles to be extended down into the open mouth 102 of the bags. The bags 69 are held between rigid panels 104 which maintain the bags 69 in a substantially planar shape as they are being filled. Means may be provided for compacting the powder in the bags 69, such a means for vertically vibrating the bags as they are filling, or means for compressing the space between adjacent panels 104 to compact the powder in the interposing bags 69. For example, vibration of a 2 mm stroke at 20 Hz provides significant compaction. A crank shaft can be mounted below the carriage to provide the vertical vibration during filling.

After the bags have been filled and compacted, they are moved to a heat seal station which may be in a separate, evacuated chamber 106 from the filling chamber 82. At the heat seal station, if desired, a small trace amount of helium (preferably below 1 mm Hg pressure) can be injected into the bags by an appropriate nozzle 108 before they are sealed closed. In order to seal the bags, a plurality of impulse heated seal bars 120, 122 are carried on retractable rods 124, 126 operated by extendable actuators 128 which permit the heating bars to be moved toward and away from one another. The open ends of the bags are moved into a position between the spaced apart bars (FIG. 8), and then the bars are moved towards one another (FIG. 9), after the spreading fingers are removed from the mouths of the bags while at an elevated temperature to press the open edge of the bags together and to heat seal the open end.

After the bags have been sealed closed, they may be moved to an outfeed air lock chamber 140 (FIG. 3) where they are tested for leaks and then reintroduced to a normal atmospheric pressure. Alternatively the heat seal chamber 106 may act as the chamber for reintroducing the sealed bags to atmospheric pressure and subsequently the panels may be tested for leaks at a separate station. The bags are then transferred by an automatic conveyor 142 to a completed storage location 144.

Figure 10:
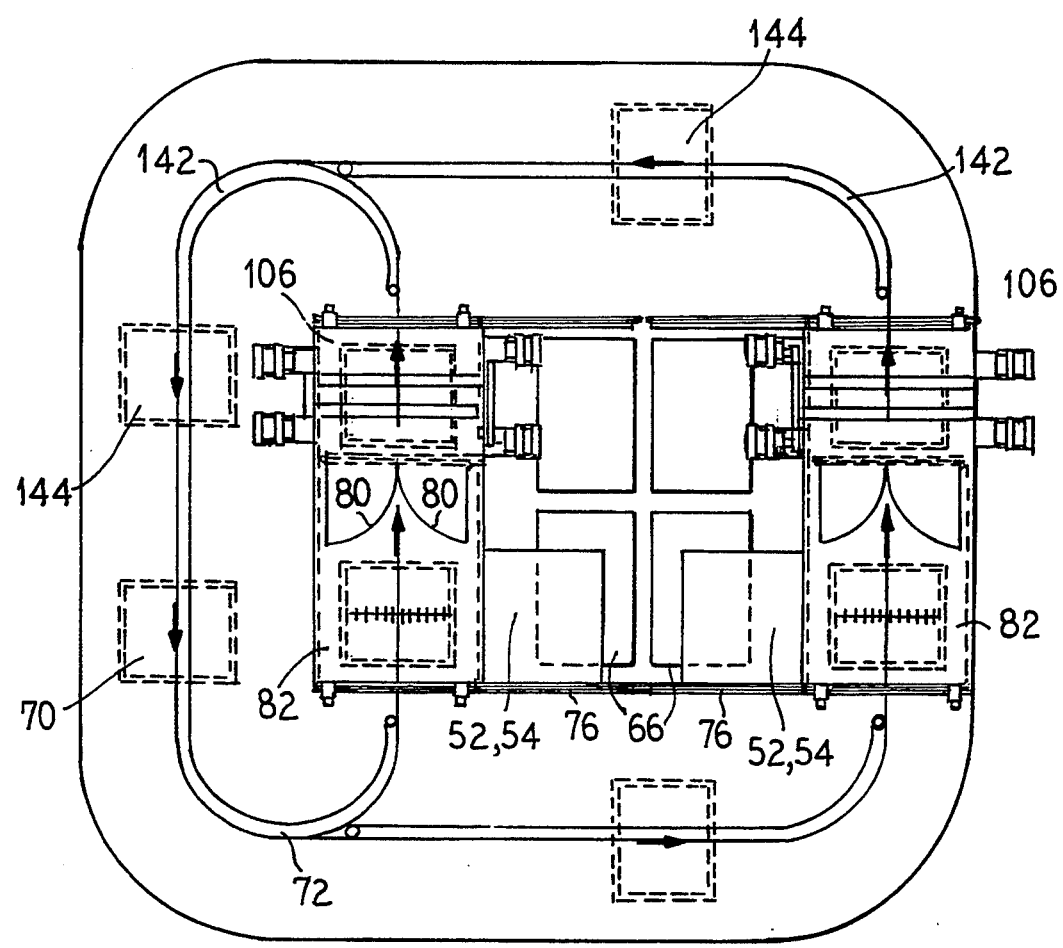
FIG. 10 is a schematic plan view illustration of an alternative layout for implementing the present invention.

An alternate embodiment of the manufacturing process is illustrated in FIG. 10. A selected number of barrier bags are transported by an automatic conveyor 72 directly into the filling chambers 82 which are initially at atmospheric pressure. Then the sliding doors 76 of the filling chambers 82 are closed and the filling chambers 82 are evacuated by means of vacuum pumps 66, preferably to a pressure of approximately 0.5 mbar. After the bags have been filled and compacted, they are moved to a heat seal station which may be in a separate, evacuated chamber 106 from the filling chamber 82. Once the bags have been sealed closed, the heat seal chamber 106 may act as the chamber for reintroducing the sealed bags to atmospheric pressure. The bags are then transferred by an automatic conveyor 142 to a completed storage location 144 for subsequent leak testing at a separate leak test station.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A method for manufacturing a vacuum insulation panel using a gas impervious barrier bag having walls formed of flexible film material joined along all but one side so as to leave one open side comprising the steps:
    1) loading a quantity of microporous powder into a storage hopper;
    2) removing moisture from said powder;
    3) evacuating gases from said powder;
    4) evacuating gases from said barrier bag;
    5) grasping and holding open said one side of said gas evacuated bag with said bag in a vertical orientation and with said open side facing upwardly;
    6) subsequently filling said gas evacuated bag with said gas evacuated powder;
    7) horizontally supporting said film material walls as said gas evacuated bag is filled with said gas evacuated powder;
    8) subsequently sealing said gas evacuated bag with said gas evacuated powder therein to form a vacuum insulation panel.

2. A method according to claim 1, wherein said removal of moisture from said powder occurs by heating said powder to a temperature elevated above standard room temperature in a vacuum environment.

3. A method according to claim 2, wherein said powder is elevated to a temperature of at least 200° C.

4. A method according to claim 1, wherein said powder is compacted in said bag prior to sealing of said bag.

5. A method according to claim 4, wherein said compaction is achieved by vibration of said bag.

6. A method according to claim 4, wherein said compaction is achieved by compression of said bag between two plates.

7. A method according to claim 1, wherein said step of filling said gas evacuated bag with gas evacuated powder occurs in an evacuated chamber and said step of sealing said bag occurs in a separate evacuated chamber, and including the step of transferring said bag between said chambers while maintaining vacuum conditions for said bag.

8. A method according to claim 1, wherein said powder is not exposed to other than vacuum and dry gases after it is dried.

9. A method according to claim 1, wherein said powder is loaded into said bag by a screw conveyor.

10. A method according to claim 1, wherein said bag is sealed by heat.

11. A method according to claim 1, wherein a multiple number of bags are filled simultaneously during said filling step.

12. A method according to claim 1, wherein a multiple number of bags are sealed simultaneously during said sealing step.

13. A method according to claim 1, wherein a trace amount of helium is injected into said bag after filling of said bag with powder and evacuation of said gases and just prior to sealing of said bag.

14. A method according to claim 13, wherein said amount of helium injected into said bag is sufficiently small so as to prevent a pressure within said bag from exceeding 1 mm Hg.

15. A method according to claim 1, wherein said bag is formed with multiple inner compartments and said compartments are filled with powder simultaneously.

16. A method according to claim 1, wherein said step of grasping and holding open said bag is accomplished automatically.

17. A method according to claim 1, wherein said step of filling occurs through a nozzle inserted into said open side of said barrier bag.

18. A method for manufacturing a vacuum insulation panel formed of a gas impermeable barrier bag having walls formed of flexible film material joined along all but one side so as to leave one open side comprising the steps:
    1) loading a quantity of microporous powder into a storage container;
    2) heating said powder to a temperature elevated above standard room temperature;
    3) simultaneously with said said step of heating said powder, removing moisture from said powder to provide a dried powder;
    4) evacuating gases from said powder;
    5) placing said gas impermeable bag into a chamber;
    6) evacuating gases from said gas impermeable barrier bag while it is in said chamber;
    7) automatically grasping and holding open said one side of said barrier bag with said bag in a vertical orientation and with said open side facing upwardly;
    8) subsequently, while said gas barrier bag is in said chamber, inserting a nozzle into said open side of said barrier bag, which nozzle communicates with said storage container;
    9) filling said dried and gas evacuated powder into said gas impermeable bag through said nozzle while said bag and powder remain in said evacuated condition in said chamber;
    10) horizontally supporting said film material walls as said barrier bag is filled;
    11) compacting said powder in said barrier bag while said one side of said barrier bag remains open;
    12) injecting a trace amount of helium into said bag after filling of said powder; and
    13) immediately thereafter sealing said gas evacuated bag with said gas evacuated powder therein to form a vacuum insulation panel.

19. A method according to claim 18, wherein a multiple number of bags are filled simultaneously during said filling step and said multiple number of bags are sealed simultaneously during said sealing step.

20. A method for manufacturing a vacuum insulation panel formed of a gas impermeable barrier bag having walls formed of flexible film material joined along all but one side so as to leave one open side comprising the steps:
    1) removing moisture from a quantity of microporous powder to form a dried powder;
    2) evacuating gases from said powder;
    3) evacuating gases from said gas impermeable barrier bag;
    4) grasping and holding open said one side of said barrier bag with said bag in a vertical orientation and with said open side facing upwardly;
    5) loading said dried powder into said gas impermeable bag while said bag and powder remain evacuated of gases;
    6) horizontally supporting said film material walls as said barrier bag is loaded with said dried powder;
    7) injecting a trace amount of helium into said bag after loading of said powder; and
    8) immediately thereafter heat sealing said gas evacuated bag with said gas evacuated powder therein to form a vacuum insulation panel.

* * * * *